United States Patent
Spadotto

(10) Patent No.: US 10,842,093 B2
(45) Date of Patent: Nov. 24, 2020

(54) DEVICE FOR DISPENSING LIQUIDS, IN PARTICULAR WATER FOR IRRIGATING GARDENS AND TERRACES

(71) Applicant: CLABER S.p.A., Fiume Veneto (IT)

(72) Inventor: Gian Luigi Spadotto, Pordenone (IT)

(73) Assignee: CLABER S.P.A., Fiume Veneto (IT)

( * ) Notice: Subject to any disclaimer, the term of this patent is extended or adjusted under 35 U.S.C. 154(b) by 0 days.

(21) Appl. No.: 16/155,959

(22) Filed: Oct. 10, 2018

(65) Prior Publication Data

US 2019/0104695 A1    Apr. 11, 2019

(30) Foreign Application Priority Data

Oct. 10, 2017  (IT) .................. 102017000113892

(51) Int. Cl.
*A01G 25/16* (2006.01)
*G05D 7/06* (2006.01)
*A01G 27/00* (2006.01)

(52) U.S. Cl.
CPC ......... *A01G 25/165* (2013.01); *A01G 27/001* (2013.01); *A01G 27/003* (2013.01); *A01G 27/005* (2013.01); *G05D 7/0617* (2013.01)

(58) Field of Classification Search
CPC .. A01G 25/165; A01G 27/001; A01G 27/003; A01G 27/005; G05D 7/0617
USPC ............................................ 239/11, 67, 69
See application file for complete search history.

(56) References Cited

U.S. PATENT DOCUMENTS

| | | | |
|---|---|---|---|
| 5,479,338 A | 12/1995 | Ericksen et al. | |
| 5,826,619 A * | 10/1998 | Roman | A01G 25/165 |
| | | | 137/624.11 |
| 5,921,280 A * | 7/1999 | Ericksen | A01G 25/167 |
| | | | 137/624.11 |
| 2006/0032136 A1 * | 2/2006 | Chou | A01G 27/003 |
| | | | 47/80 |

(Continued)

FOREIGN PATENT DOCUMENTS

| | | |
|---|---|---|
| EP | 2 628 386 A1 | 8/2013 |
| WO | 99/22586 A1 | 5/1999 |

(Continued)

OTHER PUBLICATIONS

European Search Report, dated Feb. 27, 2019 (8 pages).
Italian Search Report, dated Jun. 21, 2018 (8 pages).

*Primary Examiner* — Qingzhang Zhou
*Assistant Examiner* — Joel Zhou
(74) *Attorney, Agent, or Firm* — Jacobson Holman PLLC

(57) ABSTRACT

A device for dispensing liquids, in particular irrigation water, comprises a liquid tank (1) of displaceable type with a cover (2) for closing said tank (1), an electric pump (7) inserted into the cover (2) for drawing the liquid from the tank (1) and delivering the liquid itself to irrigation pipes extending outwards, and an electronic control unit (13) for setting the liquid delivering times. The electronic control unit (13) comprises a movable selector (15) for programming the times and durations of the liquid deliveries, a start button (16) for starting the selected program, and a display (17) for viewing the state of the device as a function of the selected program. An external power source (33) is provided, with the possibility of using rechargeable cells (35), which are automatically rechargeable and which can be enabled in case of absence of external power supply.

6 Claims, 6 Drawing Sheets

(56) References Cited

U.S. PATENT DOCUMENTS

| | | | | |
|---|---|---|---|---|
| 2008/0230623 A1* | 9/2008 | Macnow | ............ | F16K 31/46 |
| | | | | 239/11 |
| 2009/0001193 A1* | 1/2009 | Parsons | ............ | A01G 25/16 |
| | | | | 239/69 |
| 2013/0211603 A1* | 8/2013 | Brundisini | ............ | A01G 25/16 |
| | | | | 700/284 |
| 2015/0237814 A1* | 8/2015 | Moran | ............ | A01G 27/003 |
| | | | | 47/66.7 |
| 2017/0367277 A1* | 12/2017 | Mohindra | ............ | A01G 25/162 |

FOREIGN PATENT DOCUMENTS

| | | |
|---|---|---|
| WO | 99/22589 A1 | 5/1999 |
| WO | 2004/068935 A2 | 8/2004 |
| WO | 2015/126993 A1 | 8/2015 |

\* cited by examiner

DEVICE FOR DISPENSING LIQUIDS, IN PARTICULAR WATER FOR IRRIGATING GARDENS AND TERRACES

BACKGROUND OF THE INVENTION

The present invention relates to a device for dispensing liquids, in particular water for irrigating gardens and terraces.

Water dispensing devices of the displaceable type, provided with water containment tank and electrically powered pump for drawing water from the tank and feeding it to appropriately arranged irrigation pipes, are sometimes required for irrigating plants, gardens and terraces.

Such devices require an electronic programming and control unit for setting the irrigation time until the tank is emptied.

SUMMARY OF THE INVENTION

It is the object of the present invention to provide a displaceable device tor dispensing liquids, in particular irrigation water, which is adapted to set various irrigation times and durations and which also allows choosing between external power supply and cell power supply.

According to the invention, a liquid dispensing device is thus suggested, comprising a liquid tank of displaceable type with a cover for closing said tank, an electric pump inserted into said cover for drawing the liquid from the tank and delivering the liquid to irrigation pipes extending outwards, and an electronic control unit included in said cover for setting the liquid delivering times, said electronic control unit comprising a movable selector for programming start times and duration times of the liquid deliveries, a start button for starting a selected program, a display for viewing the state of the device as a function of the selected program, and first and second electric power supply means which can be alternatively used for electrically supplying the pump and the electronic control unit with constant prefixed electric voltage.

More precisely, the pump and the electronic control unit may be electrically powered either by means of an external connection, which may be of the type normally used for mobile phones, i.e. by an electric cord with a 230 Vac-to-5 Vdc adapter interposed between an external power socket and an internal socket of the device, or by rechargeable cells which may be inserted into an appropriate housing of the device and adapted to intervene automatically in case of interruption of the external power supply.

DESCRIPTION OF THE DRAWINGS

A possible practical embodiment of the device according to the invention will now be described by way of example with reference to the accompanying drawings, in which.

DETAILED DESCRIPTION OF THE INVENTION

Figure 5:
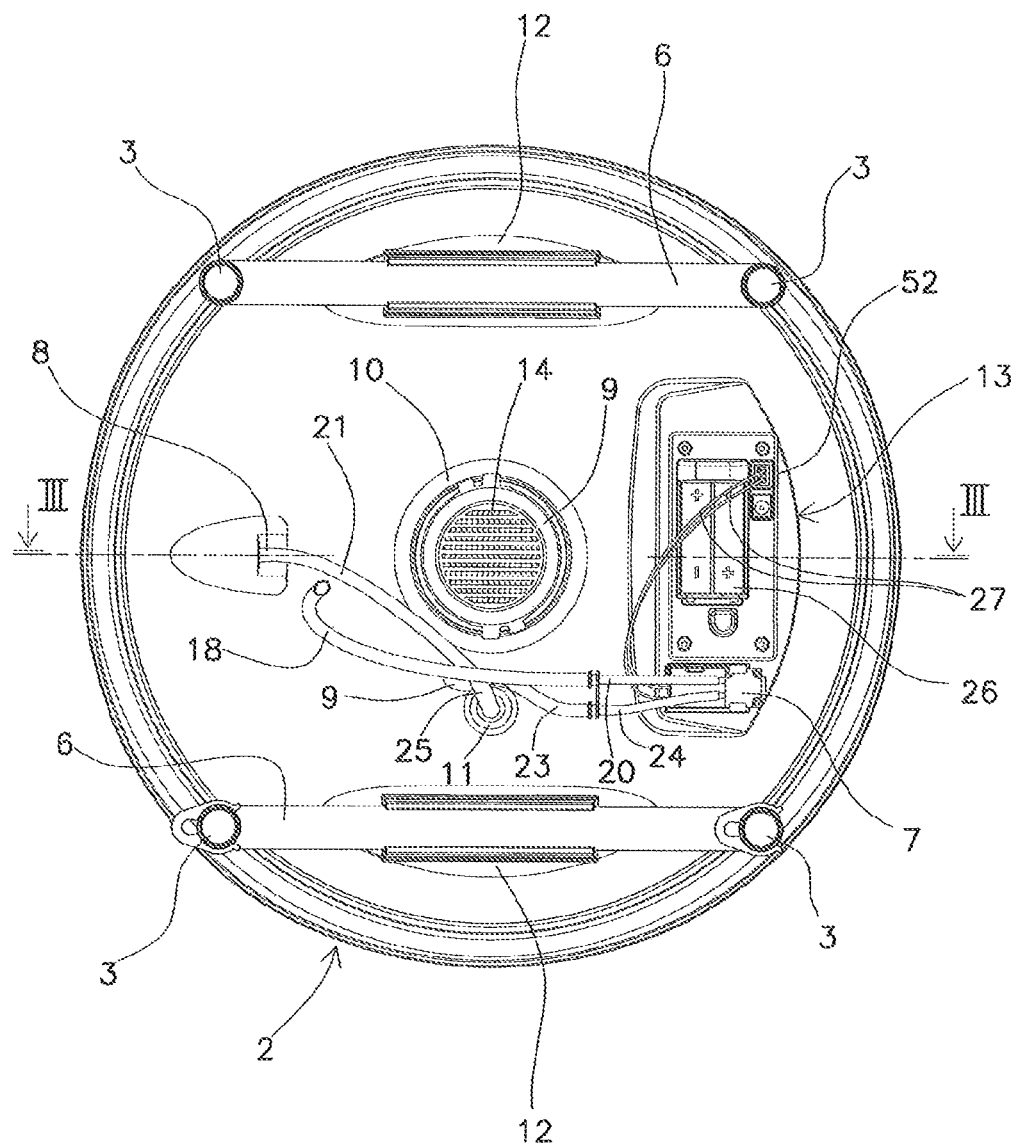
FIG. 5 shows a bottom view of the cover for closing the tank.

FIGS. 1-5 show a device consisting of a tank 1 which can be filled with the liquid to be dispensed, in general water tor irrigating gardens, terraces, vegetable patches or the like, and a closing cover 2 supported by two inverted U-shaped legs, each consisting of two vertical uprights 3, which end at the bottom inside respective hallow bosses 4 of a base 5 placed around the base of tank 1 (FIGS. 1, 3 and 4), and a connecting crossbar 6 fixed below the cover 2 by means of a clamp 12 (FIG. 5).

Cover 2 houses an electric pump 7 which can be controlled to draw liquid from tank 1 and dispense it outside at a spout 8, which can be appropriately connected to an irrigation system (FIGS. 1, 2, 3 and 5).

Cover 2 also includes an external screw-on cap 9 for closing a conical funnel 10 with mesh bottom 14 intended to fill manually tank 1, a check valve 11 and an electronic control unit 13 for manually programming the operation time of the pump 7 for the desired irrigation.

Figure 1:
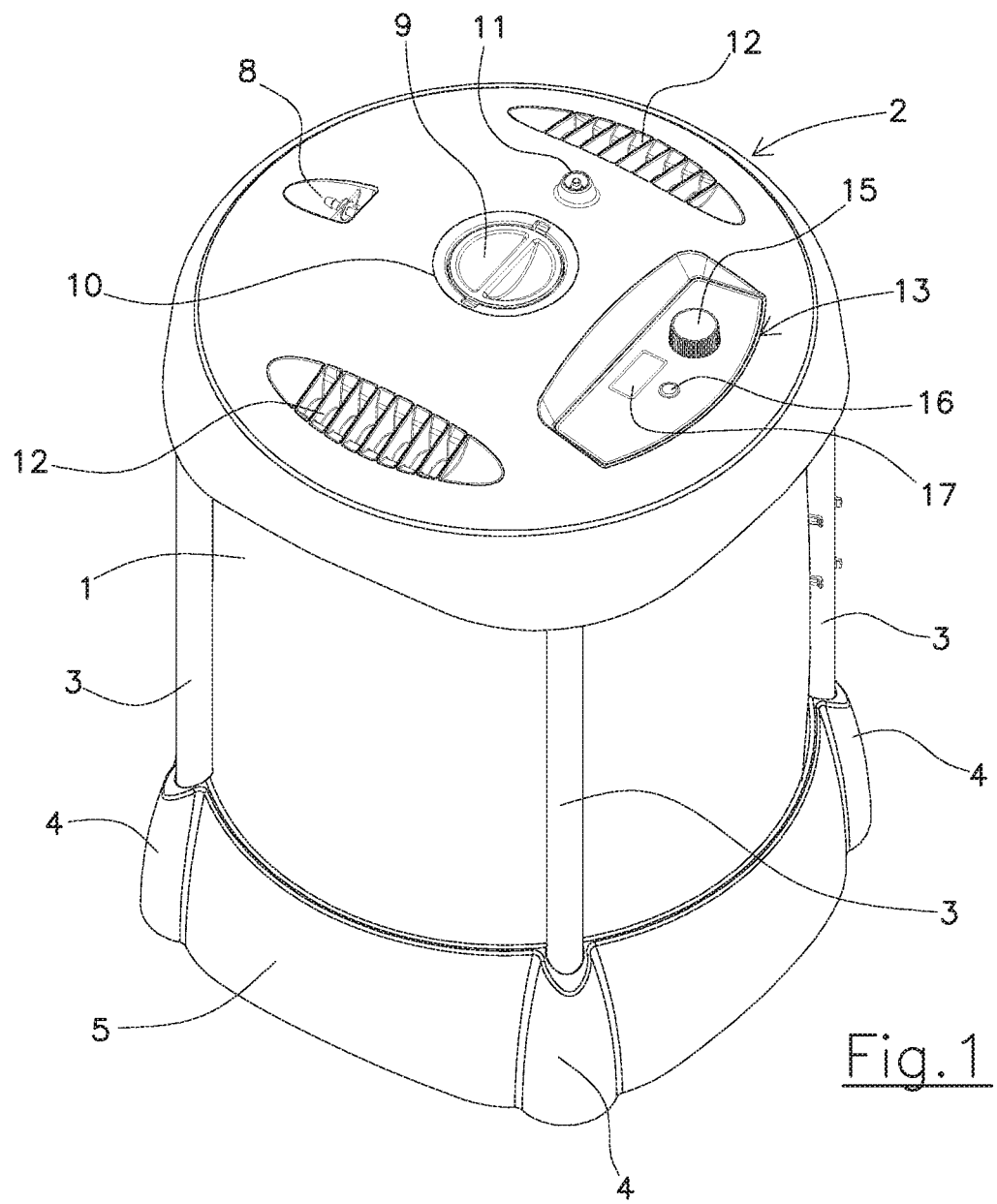
FIG. 1 shows a perspective view of a device according to the invention, consisting of a liquid tank and a cover for closing the tank equipped with a pump, an electronic control unit and a liquid delivery spout.
Figure 2:
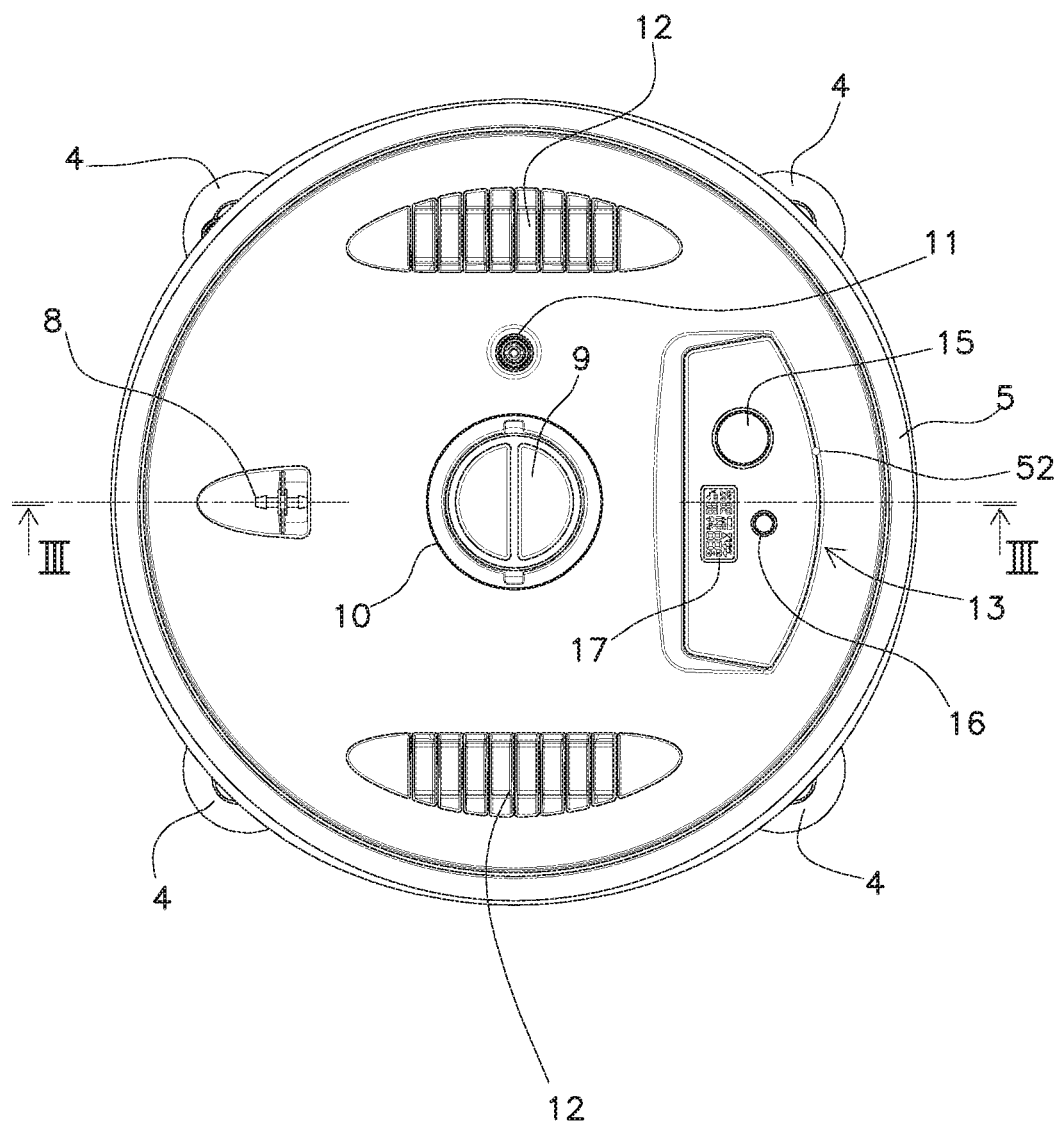
FIG. 2 shows a top plan view of the same device.

The electronic control unit 13 is partially inserted below cover 2 and externally comprises a rotary knob 15 for selecting the irrigation times and durations, a start button 16, and an LCD display 17 for viewing the state of the device according to the selected program (FIGS. 1, 2 and 5).

For electrically powering it and pump 7, the electronic control unit 13 includes, in cover 2, a socket 52 (FIGS. 2 and 5) which is suitable for the connection to an external electric source through a first jack terminal of an electric cord having a 230 Vac/5 Vdc adapter at the other terminal and also a double housing 26 (FIG. 5) which is suitable for inserting two rechargeable cells (not shown) which intervene in the absence of external power supply. A pair of electric wires 27 connects the electronic control unit 13 to the pump 7 for electrically supplying the latter (FIG. 5).

Figure 3:
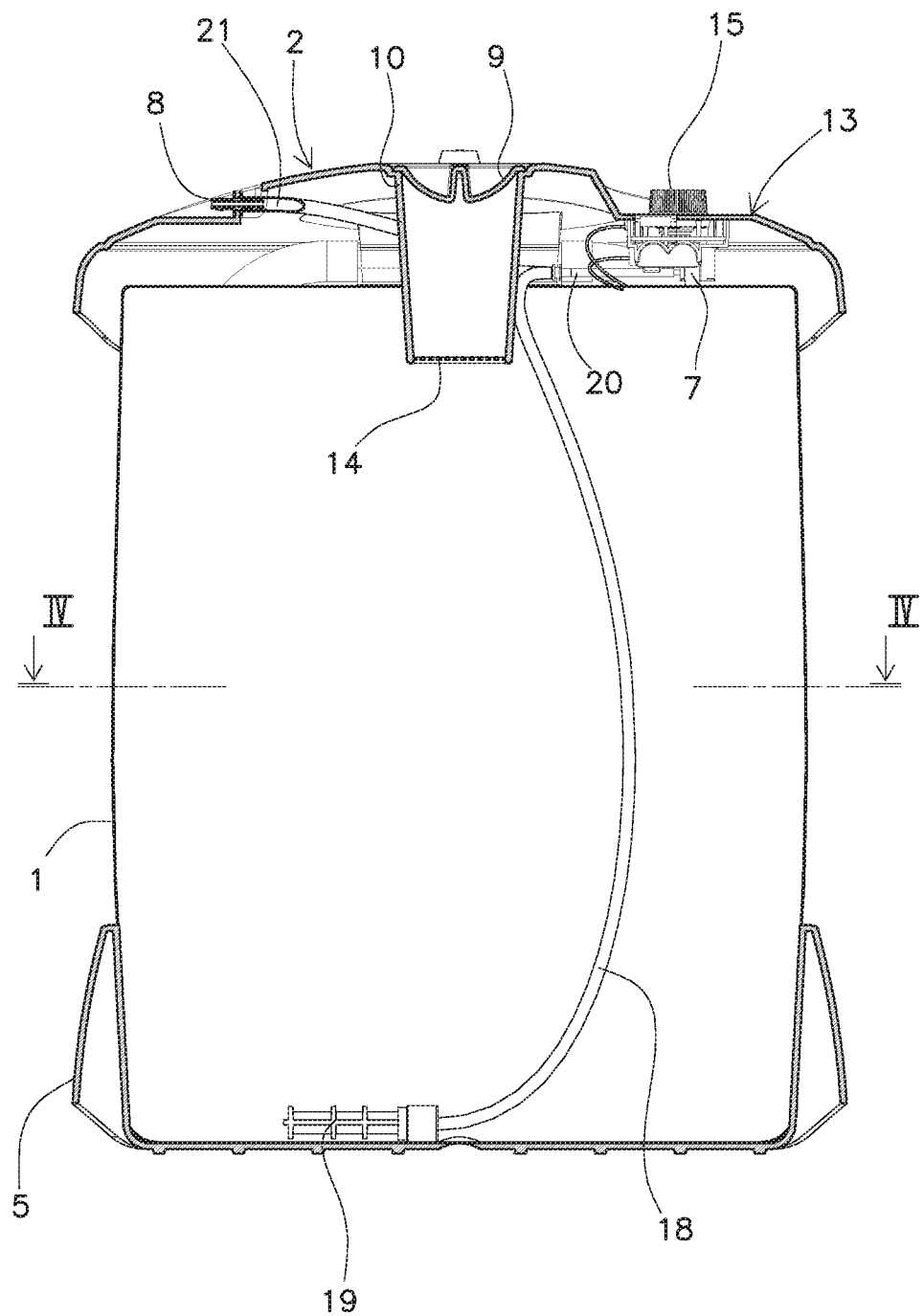
FIG. 3 shows an axial section view of the device taken along line III in FIG. 2.
Figure 4:
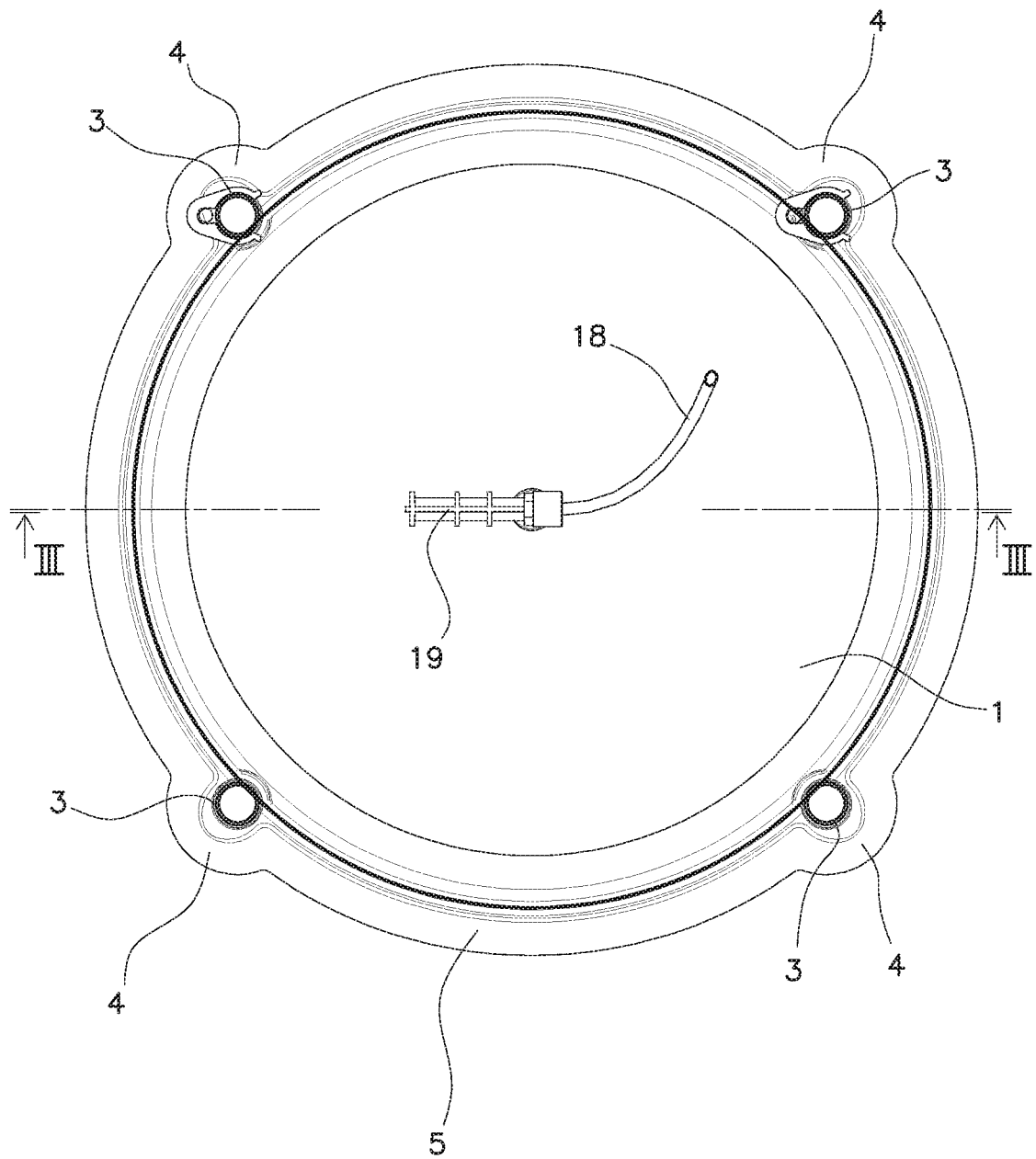
FIG. 4 shows a cross-section view of the device taken along line IV-IV in FIG. 3.

As shown in FIGS. 3 and 5, the device comprises a plurality of flexible pipes for hydraulically connecting the various internal parts of the device. In particular, one pipe 18 extends from a filtering device 19 located at the bottom of tank 1 (FIGS. 3 and 4) to a pipe 20 located in cover 2 and connected to the suction end of pump 7, and one pipe 21 extends, again inside cover 2, from the dispensing spout 8 to a first way of a three-way clamp 22, which has a second way connected, by means of a further pipe 23, to a pipe 24 connected to the delivery end of pump 7. Finally, a pipe 25 connects a third way of clamp 22 to the check valve 11.

Figure 7:
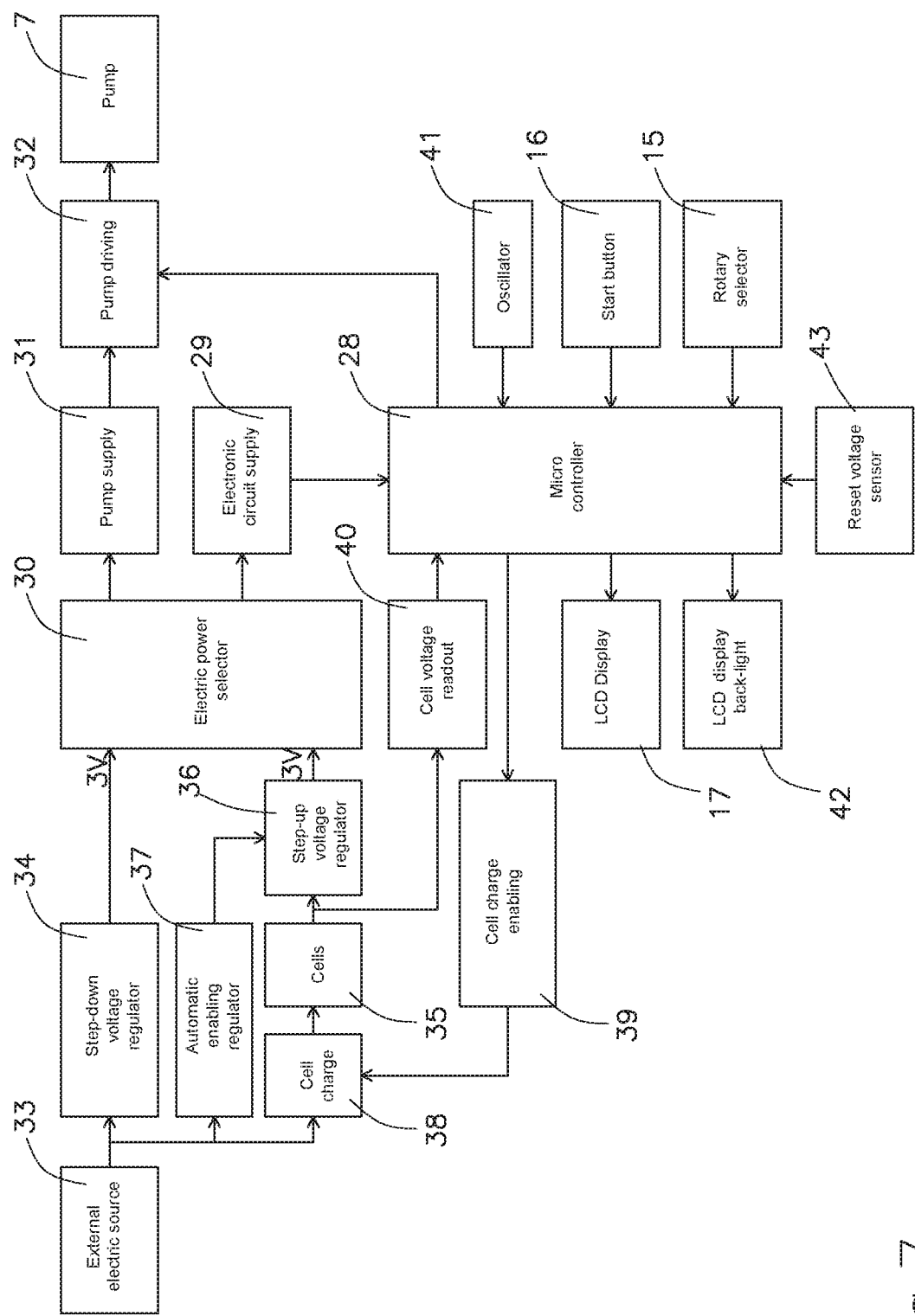
FIG. 7 shows the functional diagram of the electronic control unit included in the aforesaid device.

The functional diagram of the electronic control unit 13 is shown in FIG. 7.

The main component of the electronic control unit 13 is a microcontroller 28, which is powered by a power supply block 29 controlled by an electric power selector block 30. The electric power selector block 30 also controls a pump supply block 31 for supplying electric power to a driving block 32 used for driving the pump 7 under the control of the microcontroller 28.

The electric power selector 30 can have as an input source, via the jack socket 52, the connecting electric cord and the 230 Vac/5 Vdc adapter 33, an external electric source 33 followed by a step-down voltage regulator 34, which sets the input voltage of the selector 30 to a prefixed constant value (preferably 3V), or rechargeable cells 35 with a step-up voltage regulator 36, which regulates the input voltage of the selector 30 to the same aforesaid prefixed constant value (i.e. preferably 3V). The step-up voltage regulator 36 is enabled by an automatic enabling block 37 in the absence of voltage from the external electric source 33. The rechargeable ceils 35 receive the charge from a cell charger 38 when the latter is enabled by an enabling unit 39 controlled by the microcontroller 28. A cell charge reading block 40 informs the microcontroller 28 on the charge state of the cells. A voltage sensor 43 is connected to the microcontroller 28 in order to reset it after a total absence of voltage and when spoilage itself returns.

Microcontroller 28, which is provided with an oscillator 41, operates under the control of the rotary knob selector 15 and can be started using the start button 16. In turn, the microcontroller controls the views in display 17 and the backlight 42 of the display itself.

Figure 6:
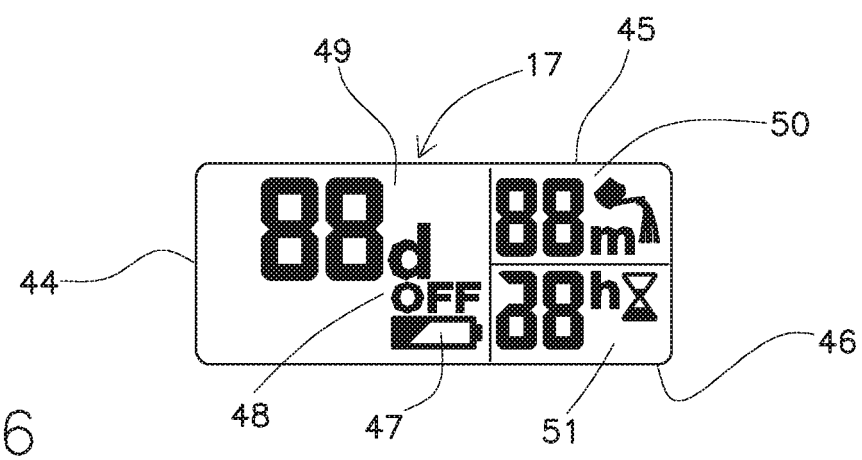
FIG. 6 shows the detail of the display of the electronic control unit with the various available views.

As shown in FIG. 6, display 17 has a screen divided into three sectors 44, 45 and 46. Sector 44 shows an indicator 47 of the state of the cells 35 (no cells if lit fixed, flat cells if flashing), an indicator 48 (OFF) showing that no automatic irrigation is programmed and an indicator 49 of the number of selected irrigation days with full tank. Sector 45 shows an indicator 50 of the remaining minutes for the irrigation in progress. Sector 46 shows an indicator 51 of the waiting hours before the beginning of the next automatic programmed irrigation.

The device described above can thus be used for irrigating plants, gardens, terraces and more.

The water tank 1 is filled by the user through fennel 10 after unscrewing the plug 9. An irrigation pipe Is connected to spout 8.

An electric cord with 230 Vac/5 Vdc adapter of the type normally used for mobile phones equipped with jack plug inserted into the socket 52 provided in the cover 2 is used for supplying electric power from an external electric source to the pump 7 and to the electronic control unit 13.

Since ensuring that the plants or other irrigated objects receive water during prolonged absences of the user may be required, and on the other hand it is possible, if not likely, that due to storms or other events the main house switch may cut off the 230 Vac power supply and may not be reactivated for long periods of time, the user can insert two AA size 1.2V rechargeable cells into the housing 26 of the electronic control unit 13 in order to prevent the plants from not receiving water in the following days. The cells, if present, are recharged by the electronic unit 13 and the recharging is managed by the microcontroller 28, as explained with reference to FIG. 7. The cells, once recharged, have sufficient energy to ensure irrigation for maximum intended use until the emptying of tank 1. The user can choose whether to install the cells or not.

At the time of use, starting from the condition with indication OFF of the indicator 48, the user activates the rotary knob 15 so as to select the total days when to perform the irrigation until the emptying of the tank, starting from full tank condition. The selectable days can be, for example, 7, 14, 21 or 28. The selected number is displayed on indicator 49. Once the selection has been made and viewed, the user presses the start button 16 to make the choice operational and start the irrigation. The minutes remaining until the end of the irrigation in progress are displayed by indicator 50.

Irrigation will be performed every day at the time at which the start button 16 was pressed for a time preset in the microcontroller to ensure that the water in the full tank lasts for all the set days.

The user can simply press the start button 16 multiple times to start the irrigation at another time. According to the setting of the microcontroller, each pressing of button 16 corresponds to a delay of one hour in the starting time with respect to the current time. The starting time is displayed by the indicator 51 as the number of hours until the next irrigation.

During the irrigation, the pump 7 draws water from the tank 1 through filter 19 and pipe 18, and feeds it via the pipes 23 and 21 to the irrigation pipe connected to the spout 8.

The check valve 11 prevents any possible effects of overpressure in the delivery pipes 31 and 21.

The constant voltage supplied to the selector 30, and therefore to the microcontroller 28 and to the pump 7, allows to keep constant the flow rate of the water delivered by the pump 7 with the amount of water in the container being changing. The amount of water delivered by the pump therefore corresponds in directly proportional way to the electronically controlled operation times of the pump.

The invention claimed is:

1. A liquid dispensing device comprising a displaceable liquid tank with a cover for closure of said displaceable liquid tank, an electric pump inserted in said cover for drawing a liquid from the displaceable liquid tank and delivering the same liquid to irrigation pipes extending outwards and an electronic control unit comprised in said cover for setting liquid delivering times of the electric pump, said electronic control unit comprising a movable program selector for programming start times and duration times of the liquid delivery, a start button for starting a selected program, a display for a visualization of a state of the liquid dispensing device as a function of the selected program, an electric power supply selector and first and second electric power supply means usable in alternative for an electric power supply of the electric power supply selector and the electric pump with a constant prefixed electric voltage, wherein said first electric power supply means comprise a socket for connection to an external electric supply source through an electric cable with a Vac/Vdc adapter and a step-down voltage regulator to maintain the constant prefixed electric voltage supplied by said first electric power supply means at a first constant prefixed value, and said second electric power supply means comprise rechargeable cells inserted into a housing arranged inside the cover and a step-up voltage regulator to maintain the constant prefixed electric voltage supplied by said second electric power supply means at a second constant prefixed value, wherein the second constant prefixed value of the constant prefixed electric voltage supplied by said second power supply means is equal to the first constant prefixed value of the constant prefixed electric voltage supplied by said first electric power supply means in order to keep a constant flow rate of the liquid delivered by the electric pump and to make a delivered amount of liquid directly proportional to operation times of the electric pump.

2. The liquid dispensing device according to claim 1, wherein said movable program selector consists of a rotary knob.

3. The liquid dispensing device according to claim 1, comprising enabling means for automatically enabling the electric power supply of the electric power supply selector through said rechargeable cells in absence of the electric power supply of the electric power supply selector from said external electric supply source.

4. The liquid dispensing device according to claim 1, wherein said electronic control unit further comprises a microcontroller which commands driving of the electric pump under a control of said movable program selector and said start button and the visualization of the state of the liquid dispensing device on said display, said microcontroller being provided with the electric power supply through said electric power supply selector which receives the electric power supply at the constant prefixed electric voltage from said external electric supply source or, in absence of the external electric supply source, from said rechargeable cells.

5. The liquid dispensing device according to claim 4, comprising charge reading and communicating means for reading a charge of the rechargeable cells and communicate the charge to said microcontroller for recharging the rechargeable cells under a control of said microcontroller.

6. The liquid dispensing device according to claim 1, wherein said display comprises an indicator of number of irrigation days programmed in a condition of full tank, an indicator of residual irrigation minutes while a programmed irrigation is operating and an indicator of waiting hours before next programmed irrigation.

* * * * *